United States Patent
Lee et al.

(10) Patent No.: US 11,325,614 B2
(45) Date of Patent: May 10, 2022

(54) SYSTEM AND METHOD FOR PROVIDING SPEED PROFILE OF SELF-DRIVING VEHICLE

(71) Applicants: Hyundai Motor Company, Seoul (KR); Kia Motors Corporation, Seoul (KR)

(72) Inventors: Hee Yun Lee, Seoul (KR); Jae Sung Bang, Yongin-si (KR); Ho Kyun Chun, Seoul (KR); Dae Ki Hong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 19 days.

(21) Appl. No.: 16/918,919

(22) Filed: Jul. 1, 2020

(65) Prior Publication Data

US 2021/0122394 A1    Apr. 29, 2021

(30) Foreign Application Priority Data

Oct. 23, 2019 (KR) .................. 10-2019-0131862

(51) Int. Cl.
*B60W 60/00* (2020.01)
*B60W 40/105* (2012.01)

(52) U.S. Cl.
CPC ...... *B60W 60/0023* (2020.02); *B60W 40/105* (2013.01); *B60W 2556/50* (2020.02); *B60W 2720/103* (2013.01)

(58) Field of Classification Search
CPC ........... B60W 60/0023; B60W 60/023; B60W 40/105; B60W 2556/50; B60W 2720/103
(Continued)

(56) References Cited

U.S. PATENT DOCUMENTS 9,081,651 B2 *   7/2015  Filev ..................... B60K 31/00
9,643,511 B2 *   5/2017  Jeon ................... G01C 21/3469
(Continued)

FOREIGN PATENT DOCUMENTS

CN       107972673 A  *  5/2018   ............. G01C 21/20
DE    102016222735 A1  *  5/2018   ............. B60W 40/10
(Continued)

OTHER PUBLICATIONS

Carlos et al., "Optimal Energy Consumption Algorithm based on Speed Reference Generation for Urban Electric Vehicles," 2015, Publisher: IEEE.*
(Continued)

*Primary Examiner* — Tuan C To
(74) *Attorney, Agent, or Firm* — Slater Matsil, LLP (57) ABSTRACT

A system for providing a speed profile of a self-driving vehicle includes a vehicle driving information prediction device, and a speed profile generation device, wherein the vehicle driving prediction device includes a navigation unit configured to set information on a drive route and a target travel time, a 3D map information provision unit configured to search for gradient information of the drive route set by the navigation unit, and a vehicle driving information provision unit, and wherein the speed profile generation device includes a vehicle energy consumption calculation unit configured to calculate energy consumption at a current speed of the vehicle when the vehicle runs along the set drive route, and a speed profile calculation unit configured to calculate a distance-based target speed profile by executing a dynamic programming algorithm.

20 Claims, 8 Drawing Sheets

(58) Field of Classification Search
USPC .......................................................... 701/27
See application file for complete search history.

(56) References Cited

U.S. PATENT DOCUMENTS

| | | | | |
|---|---|---|---|---|
| 10,457,269 | B2* | 10/2019 | Sugiyama | B60W 20/20 |
| 10,948,919 | B2* | 3/2021 | Zhu | G05D 1/0238 |
| 11,173,926 | B2* | 11/2021 | Miyahara | B60W 60/0053 |
| 2009/0259355 | A1* | 10/2009 | Li | B60W 50/0097 |
| | | | | 701/22 |
| 2010/0292886 | A1* | 11/2010 | Szczerba | G01S 13/723 |
| | | | | 701/31.4 |
| 2013/0013132 | A1* | 1/2013 | Yakimenko | B64D 17/025 |
| | | | | 701/3 |
| 2013/0261889 | A1* | 10/2013 | Sekine | B60W 50/085 |
| | | | | 701/36 |
| 2014/0058673 | A1* | 2/2014 | Wolf | G01C 21/3484 |
| | | | | 701/533 |
| 2014/0277835 | A1* | 9/2014 | Filev | G06F 17/00 |
| | | | | 701/2 |
| 2015/0120107 | A1* | 4/2015 | Yu | B60W 20/00 |
| | | | | 701/22 |
| 2016/0009278 | A1 | 1/2016 | Roos et al. | |
| 2016/0061611 | A1* | 3/2016 | Meyer | G01C 21/3469 |
| | | | | 701/1 |
| 2017/0036663 | A1 | 2/2017 | Kim et al. | |
| 2017/0146362 | A1* | 5/2017 | Bai | G08G 1/0112 |
| 2018/0134296 | A1 | 5/2018 | Oh et al. | |
| 2018/0141539 | A1* | 5/2018 | Lee | B60W 10/04 |
| 2018/0162397 | A1 | 6/2018 | Eo et al. | |
| 2019/0100207 | A1* | 4/2019 | Maruyama | B60K 6/48 |
| 2019/0291728 | A1* | 9/2019 | Shalev-Shwartz | B60W 30/165 |
| 2020/0171962 | A1* | 6/2020 | Han | B60W 10/08 |
| 2020/0406894 | A1* | 12/2020 | Akella | G01S 13/865 |

FOREIGN PATENT DOCUMENTS

| | | | | |
|---|---|---|---|---|
| DE | 102017124952 B3 * | 9/2018 | | G01C 21/3469 |
| DE | 102018130571 A1 * | 6/2019 | | B60W 30/095 |
| GB | 2556876 A * | 6/2018 | | G01C 21/3484 |
| KR | 20090061696 A | 6/2009 | | |
| KR | 20120109097 A | 10/2012 | | |
| KR | 20140078281 A | 6/2014 | | |
| KR | 20140094288 A | 7/2014 | | |
| KR | 20150003007 A | 1/2015 | | |
| KR | 20150132874 A | 11/2015 | | |
| KR | 20170016706 A | 2/2017 | | |
| KR | 20180003905 A | 1/2018 | | |
| KR | 20180055053 A | 5/2018 | | |
| KR | 20180065502 A | 6/2018 | | |

OTHER PUBLICATIONS

C. T. Krasopoulos et al., "Velocity and Torque Profile Optimization of Electric Vehicle Including Limited Overload," 2016, Publisher: IEEE.*

Russel et al., "Segmenting Highway Network Based on Speed Profiles," 2015, Publisher: IEEE.*

* cited by examiner

SYSTEM AND METHOD FOR PROVIDING SPEED PROFILE OF SELF-DRIVING VEHICLE

CROSS-REFERENCE TO RELATED APPLICATIONS

This application claims priority to Korean Patent Application No. 10-2019-0131862, filed on Oct. 23, 2019, which application is hereby incorporated herein by reference.

TECHNICAL FIELD

The present invention relates to a system and method for providing a speed profile of a self-driving vehicle.

BACKGROUND

A self-driving vehicle to be released in the future refers to a vehicle that may fully and automatically run the vehicle from a starting place to a predetermined destination recognizing a condition of the vehicle and surrounding environment without a driver's intervention.

When looking at the current level of the self-driving vehicle, a level of semi self-driving, in which various types of advanced driver assistance systems (ADAS) are applied, is being reached. Here, the ADAS includes cruise control technology that controls the vehicle to run at a predetermined speed or in a regular pattern, which is defined by a driver, an advanced smart cruise control (ASCC) that automatically adjusts a distance to a vehicle in front thereof while driving at a preset speed, a lane departure warning system (LDWS) and a lane keeping assist system (LKAS) to keep the driving lane and to prevent lane departure, and the like.

The foregoing is intended merely to aid in the understanding of the background of the present invention, and is not intended to mean that the present invention falls within the purview of the related art that is already known to those skilled in the art.

SUMMARY

The present invention relates to a system and method for providing a speed profile of a self-driving vehicle. Particular embodiments relate to a system and method for providing a speed profile of a self-driving vehicle, configured to allow the self-driving vehicle to run on the basis of an optimal speed profile calculated according to driving information and environment, thereby improving fuel economy.

One goal is for a self-driving vehicle to generate a stable drive route in consideration of a traffic environment changing in real time and collision avoidance with surrounding dynamic obstacles. Another goal for the self-driving vehicle to induce running on the basis of a speed profile to optimize vehicle fuel efficiency when running the generated drive route.

Accordingly, embodiments of the present invention provide a system and method for providing a speed profile of a self-driving vehicle that provides a target speed profile for optimizing fuel economy when a self-driving vehicle runs a preset drive route (predetermined distance) for a predetermined duration of time and provides the target speed profile as a target speed of the self-driving vehicle running the preset drive route, whereby the fuel efficiency of the self-driving vehicle can be improved.

In one embodiment of the present invention, there is provided a system for providing a speed profile of a self-driving vehicle, the system including a vehicle driving information prediction device including a navigation unit configured to set information on a drive route and a target travel time and to provide the set information to a speed profile generation device, a 3D map information provision unit configured to search for gradient information of the drive route set by the navigation unit and to provide the searched gradient information to the speed profile generation device, and a vehicle driving information provision unit configured to provide current speed information and driving distance information of the vehicle to the speed profile generation device, and the speed profile generation device including a vehicle energy consumption calculation unit configured to calculate energy consumption at a current speed of the vehicle when the self-driving vehicle runs along the set drive route, and a speed profile calculation unit configured to calculate a distance-based target speed profile by executing a dynamic programming algorithm on the basis of information provided by the vehicle driving information prediction device and the vehicle energy consumption calculation unit.

In another embodiment of the present invention, there is provided a method for providing a speed profile of a self-driving vehicle, the method including setting a drive route of the self-driving vehicle using a navigation unit, searching for gradient information present on the drive route at a 3D map information provision unit, providing current speed information and driving distance information of the vehicle at a vehicle driving information provision unit to a speed profile generation device, calculating energy consumption at a current speed when the self-driving vehicle runs along the drive route at a vehicle energy consumption calculation unit, and calculating a target speed profile on the drive route by executing a dynamic programming algorithm at a speed profile calculation unit on the basis of the drive route, the gradient information, the speed information, the driving distance information, and the energy consumption.

As described above, the following effects are provided through the system according to the one embodiment and the method according to another embodiment described above.

First, when the self-driving vehicle runs the drive route from a starting place to a destination, a reference speed profile for optimizing fuel economy can be provided, thereby providing an effect of improving fuel efficiency.

Second, compared to running using a constant speed profile according to an existing auto cruise control, running using an optimal speed profile calculated according to information and environment of a desired drive route can be induced, thereby improving fuel economy.

Third, even for the case of a non-self-driving vehicle, an optimum speed profile suitable for information and environment of a desired drive route can be provided as running guide information.

Fourth, when the self-driving vehicle is an electric vehicle or a hybrid vehicle, running using an optimal speed profile calculated according to information and environment of a desired drive route can be induced, thereby reducing the battery state of charge (SOC) consumption.

Fifth, when the self-driving vehicle is an electric vehicle or a hybrid vehicle, running using an optimal speed profile calculated according to information and environment of a desired drive route can be induced, thereby providing an advantage of more efficient power distribution between an engine and a motor.

BRIEF DESCRIPTION OF THE DRAWINGS

The above and other objectives, features and other advantages of embodiments of the present invention will be more clearly understood from the following detailed description when taken in conjunction with the accompanying drawings, in which.

DETAILED DESCRIPTION OF ILLUSTRATIVE EMBODIMENTS

Hereinbelow, exemplary embodiments of the present invention will be described in detail with reference to the accompanying drawings. Throughout the drawings, the same reference numerals will refer to the same or like parts.

Figure 1:
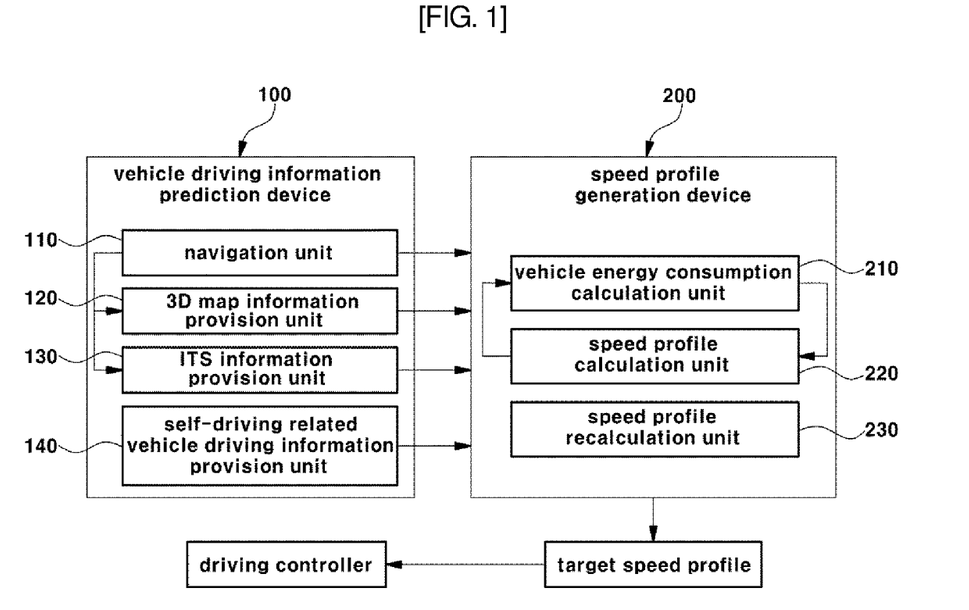
FIG. 1 is a block diagram showing a system for providing a speed profile of a self-driving vehicle according to embodiments of the present invention.

FIG. 1 is a block diagram showing a system for providing a speed profile of a self-driving vehicle according to embodiments of the present invention, where reference numeral 100 designates a vehicle driving information prediction device and reference numeral 200 designates a speed profile generation device.

The vehicle driving information prediction device 100 is a device mounted in a vehicle to provide various types of information on a desired drive route to the speed profile generation device 200 before running and includes a navigation unit 110, a 3D map information provision unit 120, an intelligent transportation system (ITS) information provision unit 130, and a self-driving related vehicle driving information provision unit 140.

The navigation unit 110 searches for a route from a starting place to a destination, having been input by a driver, thereby setting a drive route of the vehicle and at the same time setting a target travel time. In addition, the navigation unit 110 transmits information on a set drive route and target travel time into the speed profile generation device 200 and at the same time transmits the same into the 3D map information provision unit 120 and the ITS information provision unit 130.

The 3D map information provision unit 120 searches for distance-based gradient information present on the drive route transmitted from the navigation unit 110 and provides a searched gradient information to the speed profile generation device 200.

The ITS information provision unit 130 searches for traffic signal information, vehicle congestion information per each section (vehicle average speed), speed limit information, and the like present on the drive route transmitted from the navigation unit 110 and provides the same to the speed profile generation device 200.

The vehicle driving information provision unit 140 provides the speed profile generation device 200 with a distance to a front vehicle, a driving distance on a drive route, current speed information, and the like as driving information of the current vehicle.

On the other hand, the speed profile generation device 200 is a kind of processor mounted in the vehicle to provide a speed profile for obtaining the optimal fuel economy in the set drive route on the basis of the various information provided by the vehicle driving information prediction device 100 as described above and includes a vehicle energy consumption calculation unit 210, a speed profile calculation unit 220, a speed profile recalculation unit 230, and the like.

The vehicle energy consumption calculation unit 210 calculates energy consumption at the current speed when the vehicle runs along the set drive route and provides the calculated energy consumption to the speed profile calculation unit 220.

For example, the vehicle energy consumption calculation unit 210 calculates energy consumption such as battery state of charge (SOC) for an electric vehicle, equivalent fuel consumption for a hybrid vehicle, fuel consumption for an internal combustion engine, and the like and provides the calculated energy consumption to the speed profile calculation unit 220.

The speed profile calculation unit 220 executes a dynamic programming algorithm using various types of information provided by the vehicle driving information prediction device 100 as described above when the vehicle runs along the set drive route, thereby calculating a distance-based target speed profile.

In this case, the target speed profile may be provided to a controller for driving control of the self-driving vehicle as a reference speed profile for optimizing fuel efficiency, and thus the self-driving vehicle runs at a speed that meets the reference speed profile in the set drive route, thereby promoting improvement of fuel economy.

In addition, the target speed profile may be provided as guide information for improving fuel efficiency on a desired drive route even in a non-self-driving vehicle.

The speed profile recalculation unit 230 compares the vehicle speed according to the target speed profile calculated as described above and the current speed of the vehicle provided from the vehicle driving information provision unit 140 and, in the case of significant difference from each other, recalculates the target speed profile.

Here, the speed profile calculation process of embodiments of the present invention based on the above configuration will be described sequentially.

Figure 2:
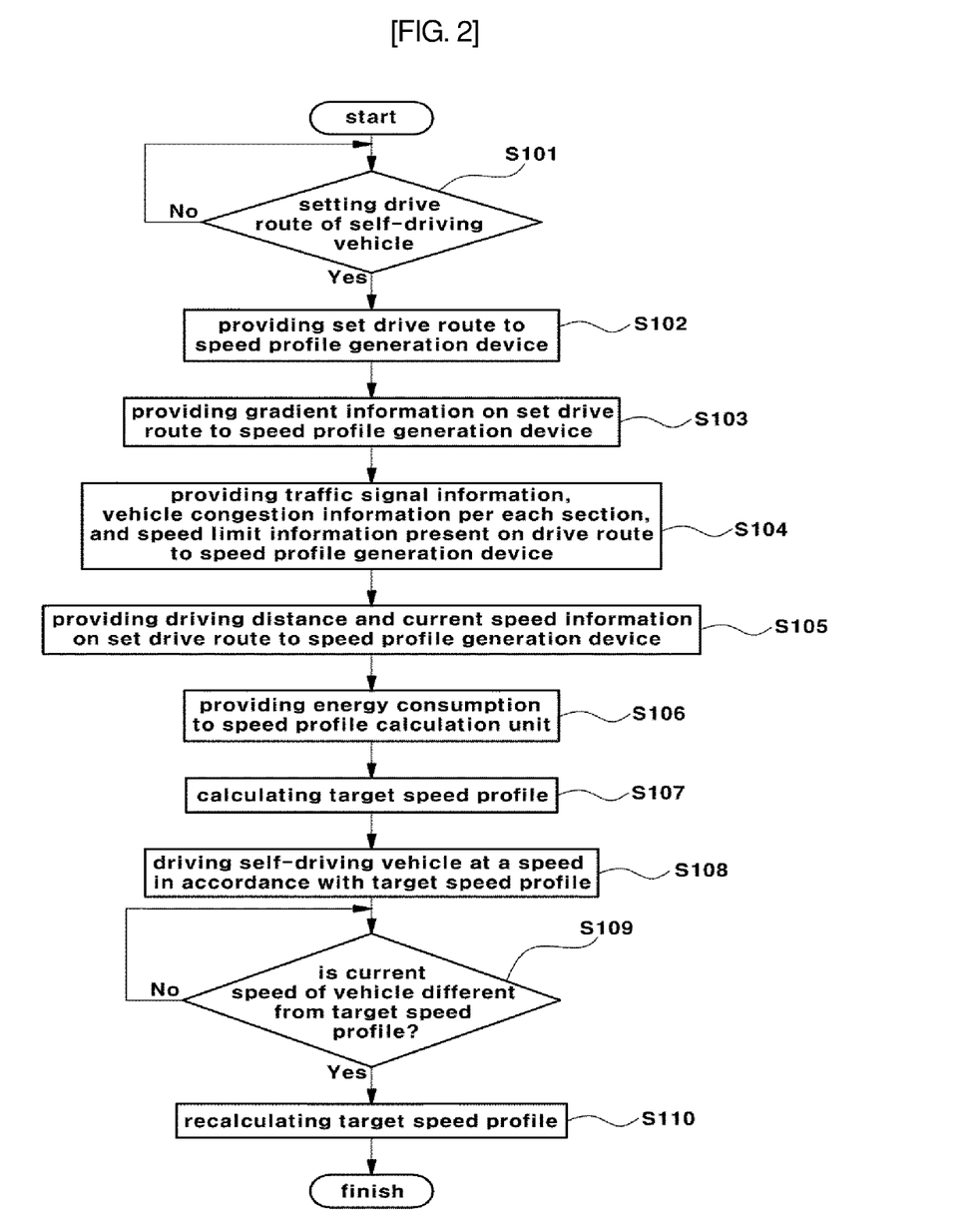
FIG. 2 is a flowchart showing a method for providing a speed profile of a self-driving vehicle according to embodiments of the present invention.

FIG. 2 is a flowchart showing a method for providing a speed profile of a self-driving vehicle according to embodiments of the present invention.

First, it is determined whether the drive route of the self-driving vehicle is set using the navigation unit 110 mounted in the vehicle at S101.

For example, the driver sets the desired drive route from the starting place to the destination using the navigation unit 110.

Subsequently, the drive route of the vehicle set at step S101 is provided to the speed profile generation device 200 at S102.

In addition, the drive route and the target travel time information set by the navigation unit 110 are transmitted to the speed profile generation device 200 as well as the 3D map information provision unit 120 and the ITS information provision unit 130.

Subsequently, the 3D map information provision unit 120 searches for distance-based gradient information present on the drive route transmitted from the navigation unit 110 and provides the gradient information on the drive route set at step S101 to the speed profile generation device 200 at S103.

In addition, the ITS information provision unit 130 searches for the traffic signal information, the vehicle congestion information per each section (vehicle average speed), the speed limit information, and the like present on the drive route transmitted from the navigation unit 110, thereby providing the searched information to the speed profile generation device 200 at S104.

In addition, the vehicle driving information provision unit 140 provides the distance to a front vehicle, a driving distance on a drive route, current speed information, and the like as driving information of the current vehicle to the speed profile generation device 200 at S105.

Subsequently, the vehicle energy consumption calculation unit 210 calculates energy consumption at the current speed when the vehicle runs along the set drive route and provides the calculated energy consumption to the speed profile calculation unit 220 at S106.

For example, the vehicle energy consumption calculation unit 210 calculates current battery SOC consumption, for the case of an electric vehicle, and provides the calculated current battery SOC consumption to the speed profile calculation unit 220.

Next, the speed profile calculation unit 220 executes the dynamic programming algorithm in which various types of information provided by the vehicle driving information prediction device 100 are substituted as described above, thereby calculating the target speed profile that is an optimal speed profile for improving fuel efficiency on the set drive route at S1o7.

More specifically, the speed profile calculation unit 220 substitutes the gradient information, the traffic signal information, the vehicle congestion information per each section, the speed limit information, the driving distance, the energy consumption, and the like in the set drive route in the dynamic programming algorithm, thereby calculating a target speed profile that is the optimal speed profile for improving fuel efficiency on the set drive route.

For example, the dynamic programming algorithm executed by the speed profile calculation unit 220 proceeds by equations 1 to 4 below.

As shown in equation 1 below, the dynamic programming algorithm defines a vehicle speed v(d) according to a distance d as a state variable, and defines a control variable u(d) according to the distance d as a control variable (d=1, 2, 3, ..., and D). Next, an objective of the dynamic programming algorithm is to find an optimal velocity profile v(d) function according to a distance, when the vehicle has reached the destination (d=D) from the first driving (d=1), the v(d) function satisfying an optimal cost function $J^*_{1,D}$ that minimizes a necessary cost function $J_{1,D}$.

$$\min\left(J_{1,D} = \sum_{d=1}^{D} L(v(d), u(d))\right) \quad \text{[Equation 1]}$$

$$\text{s.t. } \dot{v}(d) = f(v(d), u(d))$$

$$v(0) = v_{initial}$$

$$v(D) = v_{final}$$

In equation 1, the initial velocity v(o) and the final velocity v(d) of the vehicle are defined as $v_{initial}$ and $v_{final}$, respectively, the vehicle acceleration $\dot{v}(d)$ may be expressed as $\dot{v}(d)=f(v(d), u(d))$ on the basis of a vehicle powertrain model function, and the control variable u(d) may be expressed as torque of a power source (motor torque for the case of the electric vehicle).

An instantaneous cost function L at the distance d is determined according to v(d) and u(d) and may be expressed as a sum of battery energy consumption ΔSOC, and Δtime driving time taken per each section weighted by w and as shown in equation 2 below. In addition, the ΔSOC and Δtime required when the vehicle moves a distance from d−1 to d may be calculated using an estimated value soc of an amount of SOC variation.

$$L(v(d), u(d)) = \Delta SOC + \omega \cdot \Delta time \quad \text{[Equation 2]}$$

$$\Delta SOC = \int_{d-1}^{d} \frac{S\dot{O}C}{v(d)} dd$$

$$\Delta time = \int_{d-1}^{d} \frac{1}{v(d)} dd$$

On the other hand, $J_{k,D}$ may be expressed as equation 3 below as a cost function of the route from the distance d=k to the distance d=D.

$$J_{k,D} = \sum_{d=k}^{D} L(v(d), u(d)) \quad \text{[Equation 3]}$$

In addition, according to the dynamic programming algorithm, the optimal cost function $J^*_{k,D}$ from the distance d=k to the distance d=D may be expressed as equation 4 below.

$$J^*_{k,D}(v(k)) = \min\{L(v(k), u(k)) + J^*_{k+1,D}(v(k+1))\}$$

On the basis of above equations 1 to 4, the speed profile calculation unit 220 may easily calculate the target speed profile which is an optimal speed profile v(d) for improving fuel economy on a set drive route.

Further, in a process of searching for the vehicle speed v(d) according to the distance d using the dynamic programming algorithm, the traffic signal information of the vehicle, the vehicle congestion information per each section, and the speed limit information are applied as constraints of a state variable (vehicle speed), whereby only vehicle speed profiles that meet these constraints may be found using dynamic programming.

Here, the dynamic programming algorithm may calculate each cost function when changing from a speed v(d) to a next speed v(d+1), thereby searching for the optimal route. At this time, in the process of searching for the next speed v(d+1), a speed constraint may be applied to a search range of the next speed v(d+1) so that the speed that does not satisfy the constraint is excluded when calculating the optimal speed profile (e.g., when searching for the next speed v(d+1) at the current speed v(d), speeds higher than the maximum velocity do not apply to the search range of the next speed v(d+1)).

Figure 6:
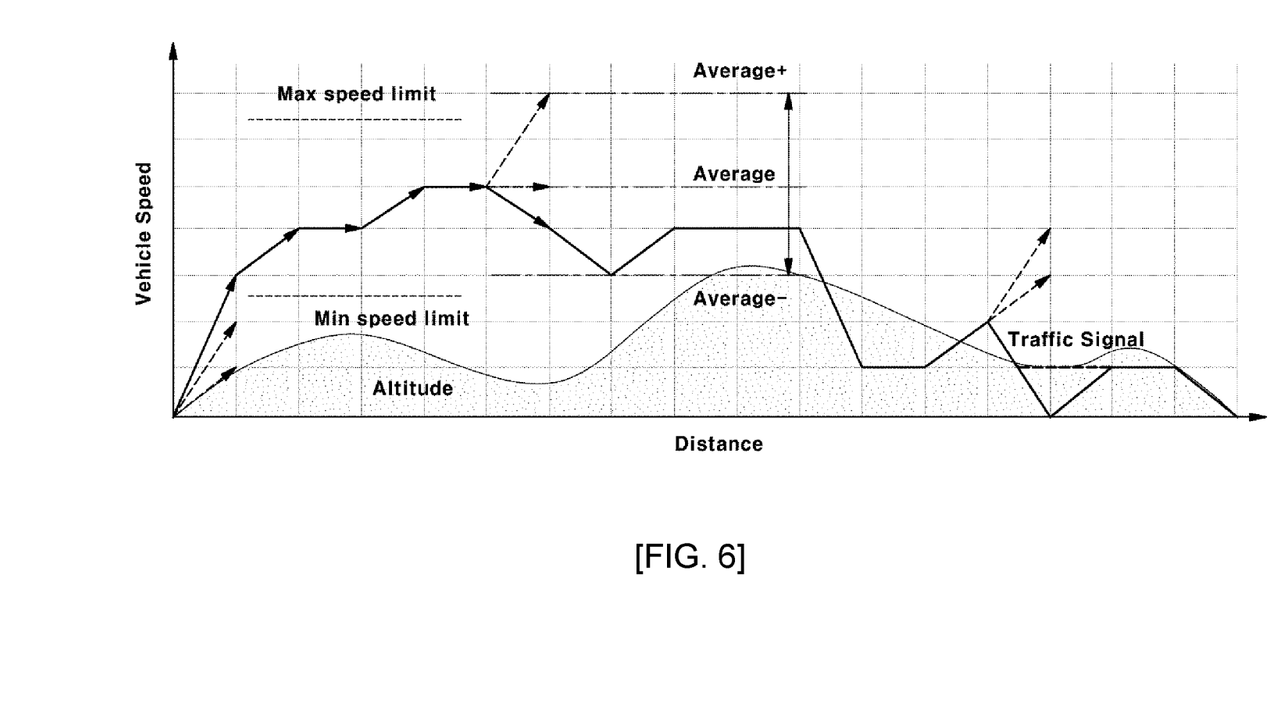
FIG. 6 is a graph showing that traffic information and the like may be used in a process for providing a speed profile of a self-driving vehicle according to embodiments of the present invention.

With reference to FIG. 6, the maximum speed or the minimum speed of the vehicle may be simply applied so as to be applied to the dynamic programming algorithm, and the speed range of the vehicle may be specified (e.g., average speed+5 km/h and average speed−5 km/h) by using the vehicle congestion information per each section or the average speed of the vehicle, thereby being used to generate the optimal speed profile of the vehicle. For the case of traffic signal information, the predicted driving time is estimated from the speed profile information of the vehicle, whereby the speed at the corresponding location at a red traffic signal is limited. As a result, the traffic signal information may be reflected in the speed profile of the vehicle.

At this time, the speed profile calculation unit 220 may partition the set drive route into a plurality of segments that is arbitrarily varied and may calculate the target speed profile with the lowest fuel consumption within a predetermined time using the sum of the energy consumption and weighted driving time per each section according to the current speed per each partitioned segment.

In this case, when partitioning the drive route into a plurality of segments, each drive route may not be uniformly partitioned but may be variably partitioned so as to provide optimized segments according to the set drive route.

One embodiment for calculating a target speed profile using the sum of the energy consumption and weighted driving time per each section is as follows.

Figure 7:
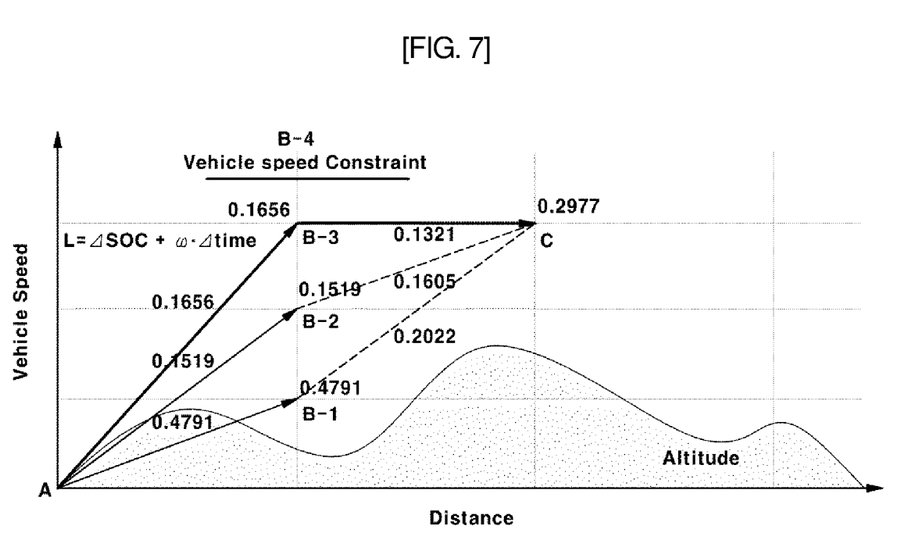
FIG. 7 is a graph showing an example for calculating the target speed profile by using a sum of energy consumption and weighted driving time per each section.

With reference to FIG. 7, when calculating the optimal velocity profile from point A to point C, the speed from point A to point B may be defined as B-1, B-2, B-3, and B-4. Then B-4, which does not meet the vehicle speed constraint, is excluded, and the instantaneous cost function L for each of B-1, B-2, and B-3 is calculated.

In addition, assuming that the speed is linearly changed to B-1 at A, the required torque of the vehicle may be calculated from the speed difference using the vehicle powertrain model, and the SOC consumption may be estimated on the basis of the calculated torque.

Assuming that the calculated instantaneous cost function (L=ΔSOC+ω·Δ·time) is 0.4791 at point B-1 as shown in FIG. 7, the cost function at point B-1 is defined as 0.4791. In the same manner, the cost functions at points B-2 and B-3 are defined as 0.1519 and 0.1656, respectively.

Similarly, when the instantaneous cost function (L=ΔSOC+ω·Δtime) for the speed changes to C from each of B-1, B-2, and B-3 is calculated, and for example, the cost function for the change from B-1 to C is 0.2022, the cost function for the change from B-2 to C is 0.1605, and the cost function for the change from B-3 to C is 0.1321 are assumed. In this case, since the smallest sum of cost functions is 0.2977 (0.1656+0.1321), it may be seen that the optimized route when moving from point A to point C is from point A to point C via point B-3.

In this way, the speed according to the distance is discretized by the dynamic programming algorithm, and the instantaneous cost function (sum of the battery consumption and the weighted required driving time) of each speed route is calculated, whereby the optimal speed profile as a solution is obtained.

Figure 4:
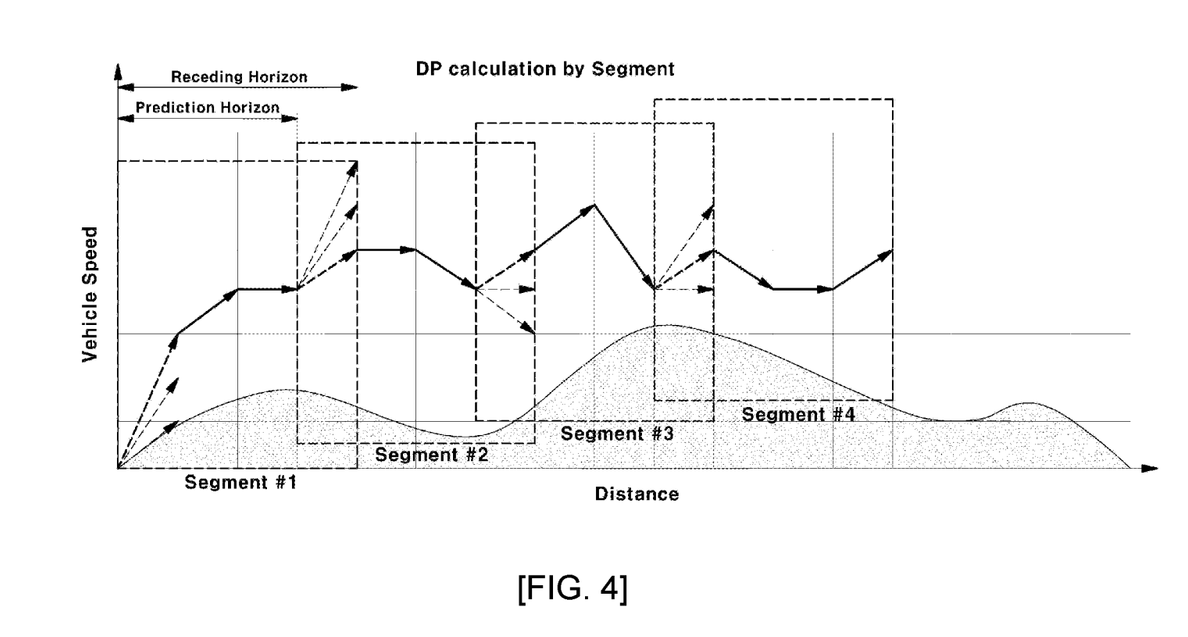
FIG. 4 is a graph showing a speed profile calculation process of a self-driving vehicle according to embodiments of the present invention being performed per segment, partitioned by a distance, of a drive route.

In addition, in order to reduce the computational load of the dynamic programming algorithm and to effectively optimize the target speed profile, as shown in FIG. 4, the drive route may be partitioned into a plurality of segments which may be arbitrarily variable, and after setting a receding horizon per each partitioned segment, calculation of a target speed profile using the same may be performed.

More specifically, the target speed profile calculation is performed per each segment, but the calculation is to be performed in advance before the vehicle reaches the prediction horizon.

In this case, the drive route defines a predetermined distance (e.g. 4 km) or a distance determined according to the gradient information and the calculation speed of the vehicle controller as a segment, and the calculation for the target speed profile derived through the dynamic programming algorithm in the corresponding segment is to be done before the vehicle reaches the corresponding segment.

Since the dynamic programming algorithm requires a large amount of computation to calculate the entire area of the vehicle driving, the dynamic programming algorithm is performed by partitioning the entire area of the vehicle driving into the segments as shown in FIG. 4, wherein the whole length of the segment is set to a receding horizon, the dynamic programming algorithm is performed in the set section, and the final vehicle speed $v_{final}$ in the calculation is assumed to be the average speed of the vehicle in the corresponding section.

In addition, instead of using the results of the entire receding horizon in the calculation results of the dynamic programming algorithm, only the velocity profile result of a forepart (e.g. 75% section) of the predetermined section is used, which is used as a prediction horizon, so that the next segment starts at the end of the prediction horizon, not at the end of the receding horizon of the previous segment. This is done to prevent a local optimization phenomenon of the speed profile caused when calculating the dynamic programming algorithm by assuming the last speed of the vehicle as the average speed of the corresponding section.

Referring back to FIG. 2, next, the target speed profile calculated in step S107 is provided to a driving controller 300 (for example, a motor controller for an electric vehicle, an engine controller and a hybrid controller which is an upper controller of the motor controller for a hybrid vehicle, and an engine controller for an internal combustion engine vehicle), thereby allowing the self-driving vehicle to run at a speed in accordance with the target speed profile in the set drive route at S108.

For example, the driving controller 300 receives the target speed profile, thereby controlling the self-driving vehicle to run at a speed in accordance with the target speed profile on the drive route.

Figure 3:
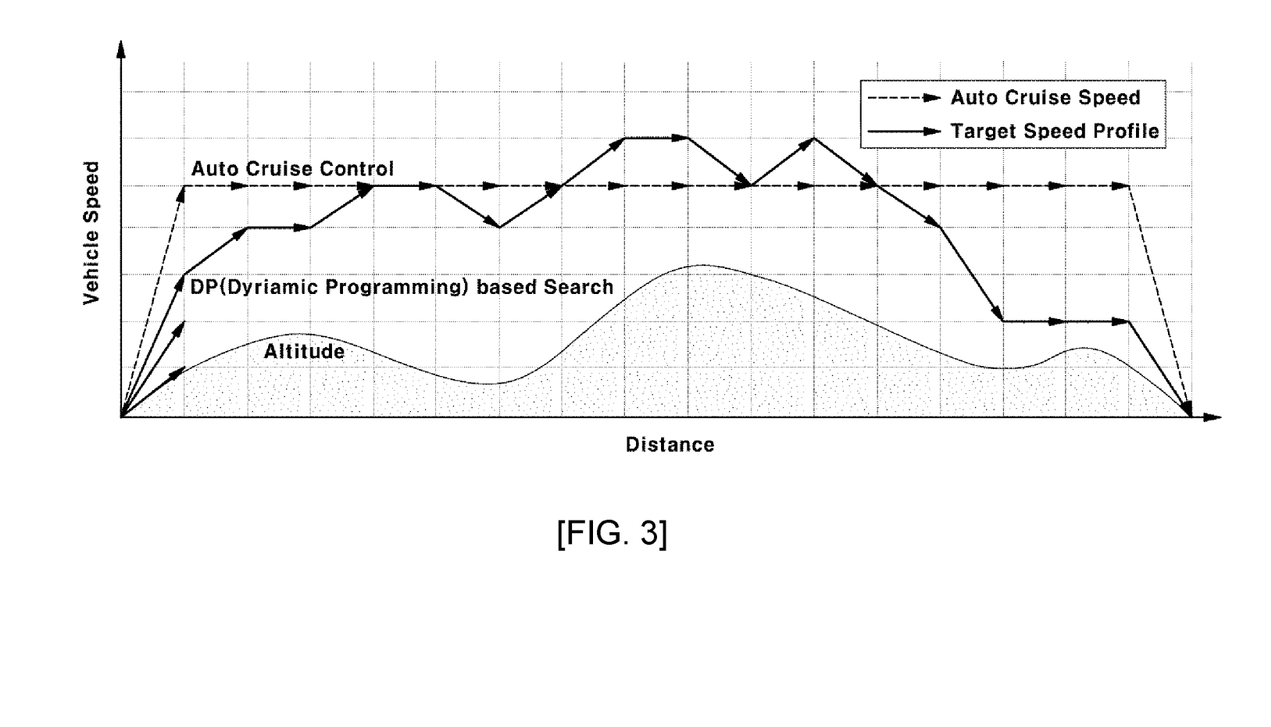
FIG. 3 is a graph comparing a speed profile provided by a system for providing a speed profile of a self-driving vehicle according to embodiments of the present invention with a speed profile by an existing auto cruise control.

With reference to a graph of FIG. 3 in which the target speed profile of embodiments of the present invention calculated as described above and the speed profile by the existing auto cruise control are compared, the speed profile by the existing auto cruise control shows a constant speed while the target speed profile of embodiments of the present invention represents a speed profile suitable for the information and the environment of the drive route. As a result, it may provide the advantage of improving the fuel economy by running with the target speed profile of embodiments of the present invention compared to running with a constant speed profile according to the existing auto cruise control.

Figure 5A:
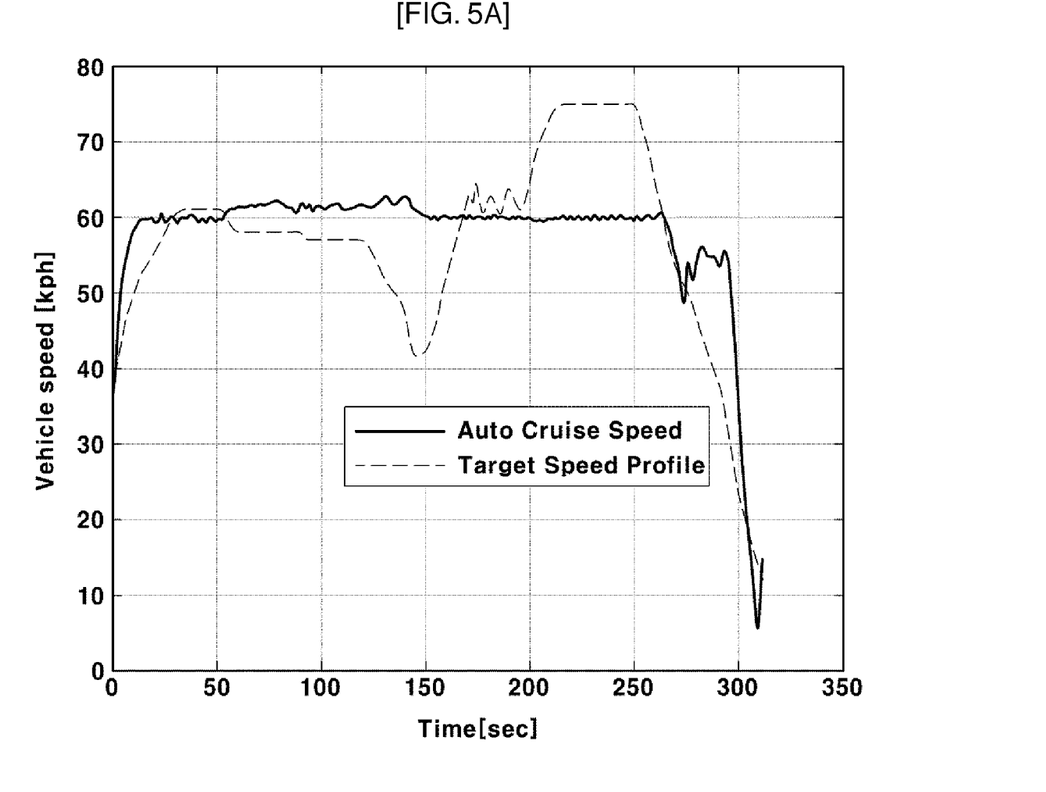
FIG. 5A is a graph comparing a vehicle speed when a self-driving vehicle runs a preset drive route for a predetermined duration of time using a speed profile provided by a system for providing the speed profile of the self-driving vehicle according to embodiments of the present invention with a vehicle speed when an existing vehicle runs the same drive route for a predetermined duration of time using a speed profile provided by an existing auto cruise control.

FIG. 5A is a graph of simulation results comparing a vehicle speed when the self-driving vehicle runs the preset drive route for a predetermined duration of time using the speed profile provided by the system for providing the speed profile of the self-driving vehicle according to embodiments of the present invention with a vehicle speed when the existing vehicle runs the same drive route for a predetermined duration of time using the speed profile provided by the existing auto cruise control.

As shown in FIG. 5A, the speed profile (solid line) by the existing auto cruise control shows a constant speed, but the target speed profile (dotted line) of embodiments of the present invention shows a speed profile whose height is different according to the information and environment of the drive route.

Figure 5B:
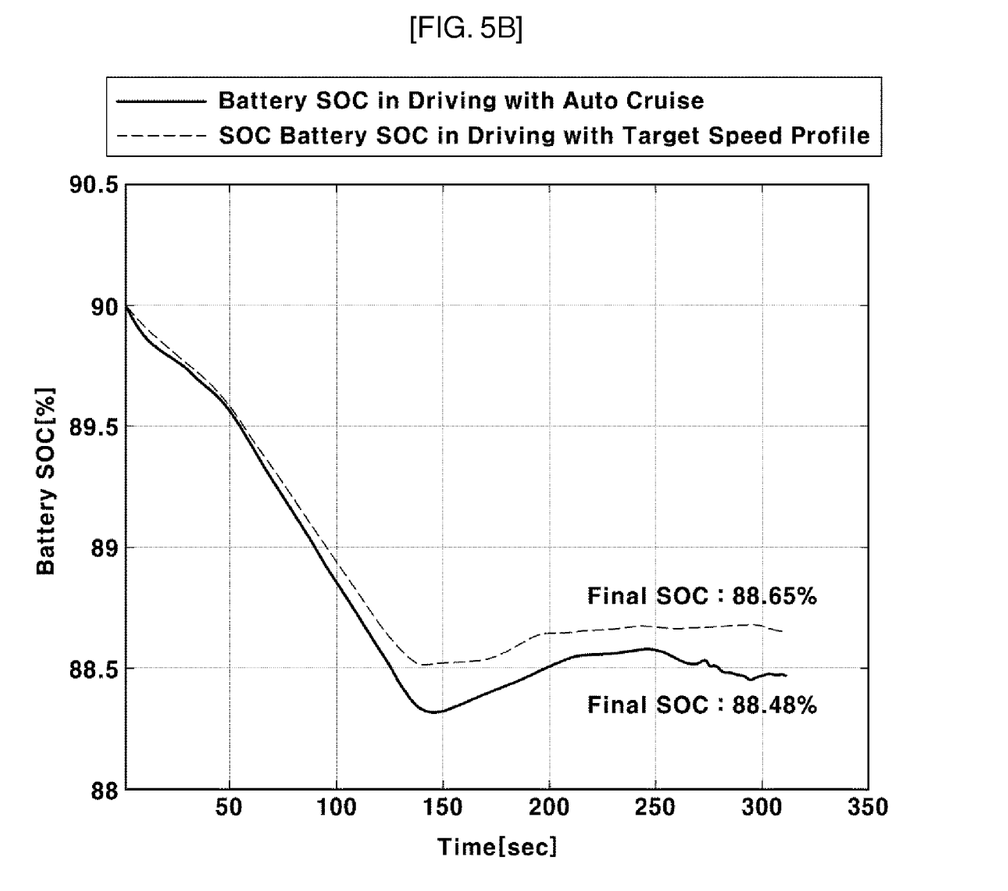
FIG. 5B is a graph comparing battery state of charge (SOC) consumption of the vehicles after the vehicles each have run at the vehicle speeds shown in FIG. 5A, wherein the self-driving vehicle runs using the speed profile provided by the system for providing the speed profile of the self-driving vehicle according to embodiments of the present invention and the existing vehicle runs using the speed profile provided by the existing auto cruise control.

FIG. 5B is a graph comparing battery SOC consumption of the vehicles after the vehicles each have run at the vehicle speeds shown in FIG. 5A, wherein the self-driving vehicle runs using the speed profile provided by the system for providing the speed profile of the self-driving vehicle according to embodiments of the present invention and the existing vehicle runs using the speed profile provided by the existing auto cruise control.

As shown in FIG. 5B, the remaining battery SOC after running using the speed profile according to the conventional auto cruise control is 88.48%, and the remaining battery SOC after running using the target speed profile of embodiments of the present invention is 88.65%. As a result, the battery SOC consumption may be reduced by about 11%.

TABLE 1

|  | Auto Cruise | DP |
|---|---|---|
| Initial SOC | 90% | 90% |
| Final SOC | 88.48% | 88.65% |
| SOC consumption (Initial − Final) | 1.52% | 1.35% |

As such, when running on the set drive route, the self-driving vehicle starts to run at a speed in accordance with the target speed profile by the driving controller and may obtain an effect of improving the fuel efficiency as the target speed profile is a reference speed profile for optimizing fuel efficiency.

Referring to FIG. 2, on the other hand, it is checked whether or not the current speed of the vehicle is different from the target speed profile at S109. When the current speed of the vehicle is different from the target speed profile, a step of recalculating the target speed profile may further proceed at Silo.

In more detail, when the self-driving vehicle is running at a speed in accordance with a target speed profile, the vehicle speed may become different from the target speed profile according to an intervention of the driver or the driving status of the vehicle, or the driving condition, the environment, and the like may be changed when the driver changes destination information through the navigation unit or the like. In this case, the step of recalculating the target speed profile proceeds.

To this end, the speed profile recalculation unit 230 compares the target speed profile calculated by the speed profile calculation unit 220 and the current speed of the vehicle provided from the vehicle driving information provision unit 140 with each other. In the case of a significant difference from each other, the speed profile calculation unit 220 calculates a new target speed profile in the same manner as the calculation of the target speed profile using a dynamic programming algorithm.

Of course, the target speed profile newly calculated in step S110 is provided to the driving controller of the vehicle, so that the self-driving vehicle continues to run at the speed in accordance with the target speed profile, thereby improving fuel economy compared to the running according to the existing auto cruise control.

As described above, the system and method for providing the speed profile of embodiments of the present invention is for providing a speed profile for optimizing the fuel economy of the self-driving vehicle, but may be applied to a non-self-driving vehicle to calculate a speed profile for fuel efficiency optimization and then may use the speed profile as a fuel economy driving guide.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A system for a vehicle, the system comprising:
   a vehicle driving information prediction device; and
   a speed profile generation device;
   wherein the driving information prediction device comprises:
      a navigation unit configured to set information on a drive route and a target travel time and to provide the set information to the speed profile generation device;
      a 3D map information provision unit configured to search for gradient information of the drive route set by the navigation unit and to provide the searched gradient information to the speed profile generation device; and
      a vehicle driving information provision unit configured to provide current speed information and driving distance information of the vehicle to the speed profile generation device; and
   wherein the speed profile generation device comprises:
      a vehicle energy consumption calculation unit configured to calculate energy consumption at a current speed of the vehicle when the vehicle runs along the set drive route; and
      a speed profile calculation unit configured to partition the set drive route into a plurality of segments that is arbitrarily variable and to calculate a distance-based target speed profile by executing a dynamic programming algorithm based on information provided by the vehicle driving information prediction device and the vehicle energy consumption calculation unit, the target speed profile comprises being calculated using a sum of the energy consumption and weighted driving time per each segment according to the current speed per each segment.

2. The system of claim 1, wherein the vehicle driving information prediction device further comprises an intelligent transportation system (ITS) information provision unit, the ITS information provision unit being configured to search for traffic signal information, a vehicle average speed, and speed limit information of the drive route set by the navigation unit and to provide the traffic signal information, the vehicle average speed, and the speed limit information to the speed profile generation device.

3. The system of claim 1, wherein the speed profile generation device further comprises a speed profile recalculation unit configured to compare the target speed profile with the current speed of the vehicle.

4. The system of claim 3, wherein the speed profile recalculation unit is configured to recalculate the target speed profile when a difference between the target speed profile and the current speed of the vehicle exceeds a threshold.

5. The system of claim 1, further comprising a driving controller configured to receive the target speed profile and to control the vehicle to run at a speed in accordance with the target speed profile on the drive route.

6. A method for providing a speed profile of a self-driving vehicle, the method comprising:
setting a drive route of the vehicle using a navigation unit;
searching for gradient information present on the drive route;
determining current speed information and driving distance information of the vehicle;
calculating energy consumption at a current speed when the vehicle runs along the drive route; and
calculating a target speed profile on the drive route by executing a dynamic programming algorithm based on the drive route, the gradient information, the current speed information, the driving distance information, and the energy consumption, wherein calculating the target speed profile comprises partitioning the set drive route into a plurality of segments that is arbitrarily variable and calculating the target speed profile using a sum of the energy consumption and weighted driving time per each segment according to the current speed per each segment.

7. The method of claim 6, further comprising:
searching for traffic signal information, vehicle average speed, and speed limit information present on the drive route; and
providing the traffic signal information, the vehicle average speed, and the speed limit information for use in generating a speed profile.

8. The method of claim 6, wherein the vehicle is an electric vehicle, the method further comprising calculating battery state of charge (SOC) consumption.

9. The method of claim 8, wherein the dynamic programming algorithm is further based the calculated battery SOC consumption.

10. The method of claim 6, further comprising providing the gradient information, traffic signal information, vehicle congestion information per each segment, speed limit information, a driving distance, and the energy consumption in the set drive route to the dynamic programming algorithm, wherein the target speed profile comprises an optimal speed profile for improving fuel economy on the set drive route.

11. The method of claim 6, further comprising adjusting a driving speed of the vehicle on the drive route to a speed in accordance with the target speed profile.

12. The method of claim 11, wherein adjusting the driving speed of the vehicle comprises providing the target speed profile to a driving controller of the vehicle.

13. The method of claim 6, further comprising comparing the target speed profile with the current speed of the vehicle.

14. The method of claim 13, wherein, when the current speed of the vehicle is different from the target speed profile, the method further comprises recalculating the target speed profile.

15. The method of claim 14, wherein recalculating the target speed profile comprises using the dynamic programming algorithm.

16. A vehicle including a system for providing a speed profile, the vehicle comprising:
a vehicle driving information prediction device; and
a speed profile generation device;
wherein the vehicle driving information prediction device comprises:
a navigation unit configured to set information on a drive route and a target travel time and to provide the set information to the speed profile generation device;
a 3D map information provision unit configured to search for gradient information of the drive route set by the navigation unit and to provide the searched gradient information to the speed profile generation device; and
a vehicle driving information provision unit configured to provide current speed information and driving distance information of the vehicle to the speed profile generation device;
wherein the speed profile generation device comprises:
a vehicle energy consumption calculation unit configured to calculate energy consumption at a current speed of the vehicle when the vehicle runs along the set drive route; and
a speed profile calculation unit configured to partition the set drive route into a plurality of segments that is arbitrarily variable and to calculate a distance-based target speed profile by executing a dynamic programming algorithm based on information provided by the vehicle driving information prediction device and the vehicle energy consumption calculation unit, the target speed profile comprises being calculated using a sum of the energy consumption and weighted driving time per each segment according to the current speed per each segment; and
wherein the vehicle is a self-driving vehicle or a semi-self-driving vehicle.

17. The vehicle of claim 16, wherein the vehicle driving information prediction device further comprises an intelligent transportation system (ITS) information provision unit, the ITS information provision unit being configured to search for traffic signal information, a vehicle average speed, and speed limit information of the drive route set by the navigation unit and to provide the traffic signal information, the vehicle average speed, and the speed limit information to the speed profile generation device.

18. The vehicle of claim 16, wherein the speed profile generation device further comprises a speed profile recalculation unit configured to recalculate the target speed profile when a difference between the target speed profile and the current speed of the vehicle exceeds a threshold.

19. The vehicle of claim 16, further comprising a driving controller configured to receive the target speed profile and to control the vehicle to run at a speed in accordance with the target speed profile on the drive route.

20. The vehicle of claim 18, wherein the speed profile recalculation unit is configured to recalculate the target speed profile when a difference between the target speed profile and the current speed of the vehicle exceeds a threshold.

* * * * *